United States Patent
Jeon et al.

(10) Patent No.: US 12,337,693 B2
(45) Date of Patent: Jun. 24, 2025

(54) SUSPENSION APPARATUS FOR VEHICLE

(71) Applicant: HYUNDAI MOBIS CO., LTD., Seoul (KR)

(72) Inventors: Jae Woong Jeon, Yongin-si (KR); Jin Wook Joo, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 415 days.

(21) Appl. No.: 18/084,765

(22) Filed: Dec. 20, 2022

(65) Prior Publication Data
US 2023/0311636 A1    Oct. 5, 2023

(30) Foreign Application Priority Data

Apr. 4, 2022  (KR) ................ 10-2022-0041568

(51) Int. Cl.
| | | |
|---|---|---|
| *B60K 7/00* | (2006.01) | |
| *B60G 7/00* | (2006.01) | |
| *B62D 7/18* | (2006.01) | |

(52) U.S. Cl.
CPC ............ *B60K 7/0007* (2013.01); *B60G 7/001* (2013.01); *B60G 7/008* (2013.01); *B62D 7/18* (2013.01); *B60G 2200/14* (2013.01); *B60G 2200/422* (2013.01); *B60G 2200/445* (2013.01); *B60G 2202/24* (2013.01); *B60G 2204/148* (2013.01); *B60G 2204/4104* (2013.01); *B60G 2204/45* (2013.01); *B60G 2300/50* (2013.01)

(58) Field of Classification Search
CPC ............................... B60K 7/0007; B62D 7/18
See application file for complete search history.

(56) References Cited

U.S. PATENT DOCUMENTS

| | | | | |
|---|---|---|---|---|
| 7,438,493 | B2* | 10/2008 | Holmes | F16C 11/0671 403/50 |
| 11,433,725 | B2* | 9/2022 | Sano | F16F 1/3863 |
| 11,473,646 | B2* | 10/2022 | Sano | F16F 1/3863 |
| 2011/0033227 | A1* | 2/2011 | Kwon | B29C 45/14491 403/135 |
| 2015/0322998 | A1* | 11/2015 | Lee | B60G 7/005 403/133 |

FOREIGN PATENT DOCUMENTS

| | | | | |
|---|---|---|---|---|
| EP | 4119368 A1 * | 1/2023 | ............ | B60G 7/005 |
| JP | 2006160008 A * | 6/2006 | | |
| JP | 2020104696 A * | 7/2020 | ............ | B60G 15/06 |
| KR | 20180135519 A * | 12/2018 | | |
| WO | WO-2015104941 A1 * | 7/2015 | ........... | B60G 13/005 |

* cited by examiner

*Primary Examiner* — Steve Clemmons
(74) *Attorney, Agent, or Firm* — NSIP Law

(57) ABSTRACT

A suspension apparatus for a vehicle including a drive unit configured to provide driving power to a wheel, a first knuckle coupled to the drive unit and configured to transmit a steering force to the wheel, a second knuckle disposed to face the first knuckle and configured to support the first knuckle so that the first knuckle is rotatable, a suspension arm extending from a vehicle body and configured to absorb impact applied to the wheel, a bushing unit provided between the second knuckle and the suspension arm and configured to support the second knuckle so that the second knuckle is rotatable relative to the suspension arm and a rotation restriction unit provided on the bushing unit and configured to selectively restrict a rotation direction of the second knuckle.

15 Claims, 15 Drawing Sheets

SUSPENSION APPARATUS FOR VEHICLE

CROSS-REFERENCE TO RELATED APPLICATION

This application claims the benefit under 35 USC § 119(a) of Korean Patent Application No. 10-2022-0041568, filed on Apr. 4, 2022, the entire disclosure of which is incorporated herein by reference for all purposes.

BACKGROUND

Field

Exemplary embodiments of the present disclosure relate to a suspension apparatus for a vehicle, and more particularly, to a suspension apparatus for a vehicle, in which a steering axis and a suspension operating axis are separated from each other.

Description of the Related Art

In general, the use of vehicles around the world is being changed to a means for expanding a living space instead of a means of transportation. Therefore, a purpose-built vehicle (PBV) with a large interior space is in the limelight. Such a purpose-built vehicle expands the interior space by adopting an in-wheel motor configured to directly operate a wheel. In the case of the in-wheel motor, a drive motor is positioned inside the wheel, unlike a typical electric vehicle in which a drive motor is disposed at a location at which an internal combustion engine in the related art was placed.

However, because of the in-wheel motor, a wheel internal space is narrowed and a kingpin offset is increased in comparison with the related art, which causes a problem in that torque steer, which arbitrarily steers the wheel, occurs when driving power and braking force are applied to the wheel.

SUMMARY

In one general aspect, here is provided a suspension apparatus for a vehicle, including a drive unit configured to provide a driving power to a wheel, a first knuckle coupled to the drive unit and configured to transmit a steering force to the wheel, a second knuckle disposed to face the first knuckle and configured to support the first knuckle so that the first knuckle is rotatable, a suspension arm extending from a vehicle body and configured to absorb an impact applied to the wheel, a bushing unit provided between the second knuckle and the suspension arm and configured to support the second knuckle so that the second knuckle is rotatable relative to the suspension arm, and a rotation restriction unit provided on the bushing unit and configured to selectively restrict a rotation direction of the second knuckle.

The bushing unit may include a casing coupled to the suspension arm, a stud installed in the casing and configured to be rotatable about multiple axes, and an extension part extending from the stud and coupled to the second knuckle.

The rotation restriction unit may include a first rotation restriction unit installed between the casing and the extension part and configured to interfere with the extension part to restrict a rotation of the stud about a first axis.

The first axis may be disposed to be perpendicular to a ground surface.

The first rotation restriction unit may include a first rotation restriction body installed between the casing and the extension part, a first rotation restriction member provided at a first side of an inner peripheral surface of the first rotation restriction body and configured to come into contact with the extension part as the stud rotates about the first axis, and a first rotation allowance member provided at a second side of the inner peripheral surface of the first rotation restriction body and configured to allow the stud to rotate about a second axis perpendicular to the first axis.

The first rotation restriction body may be elastically deformable.

The first rotation restriction body may include a deformation guide part formed through the first rotation restriction body and configured to guide deformation of the first rotation restriction body.

A first interval between the first rotation restriction member and the extension part may be smaller than a second interval between the first rotation allowance member and the extension part.

The rotation restriction unit further may include a second rotation restriction unit extending from the casing and configured to interfere with the extension part to restrict a rotation of the stud about the first axis.

The second rotation restriction unit may include a second rotation restriction body extending from the casing in a longitudinal direction of the extension part, a second rotation restriction member provided at a third side of an inner peripheral surface of the second rotation restriction body and configured to come into contact with the extension part as the stud rotates about the first axis, and a second rotation allowance member provided at a fourth side of the inner peripheral surface of the second rotation restriction body and configured to allow the stud to rotate about the second axis perpendicular to the first axis.

A third interval between the second rotation restriction member and the extension part may be smaller than a fourth interval between the second rotation allowance member and the extension part.

A fifth interval between the second rotation restriction member and the extension part may be larger than a sixth interval between the first rotation restriction member and the extension part.

The bushing unit may also include a bearing provided between the casing and the stud and configured to support the stud so that the stud is rotatable relative to the casing.

The bushing unit may also include a shield configured to prevent foreign substances from being introduced into the casing.

The shield may be provided in a bellows shape, a first end of the shield may be fixed to an outer peripheral surface of the casing, and a second end of the shield may be fixed to an outer peripheral surface of the extension part This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
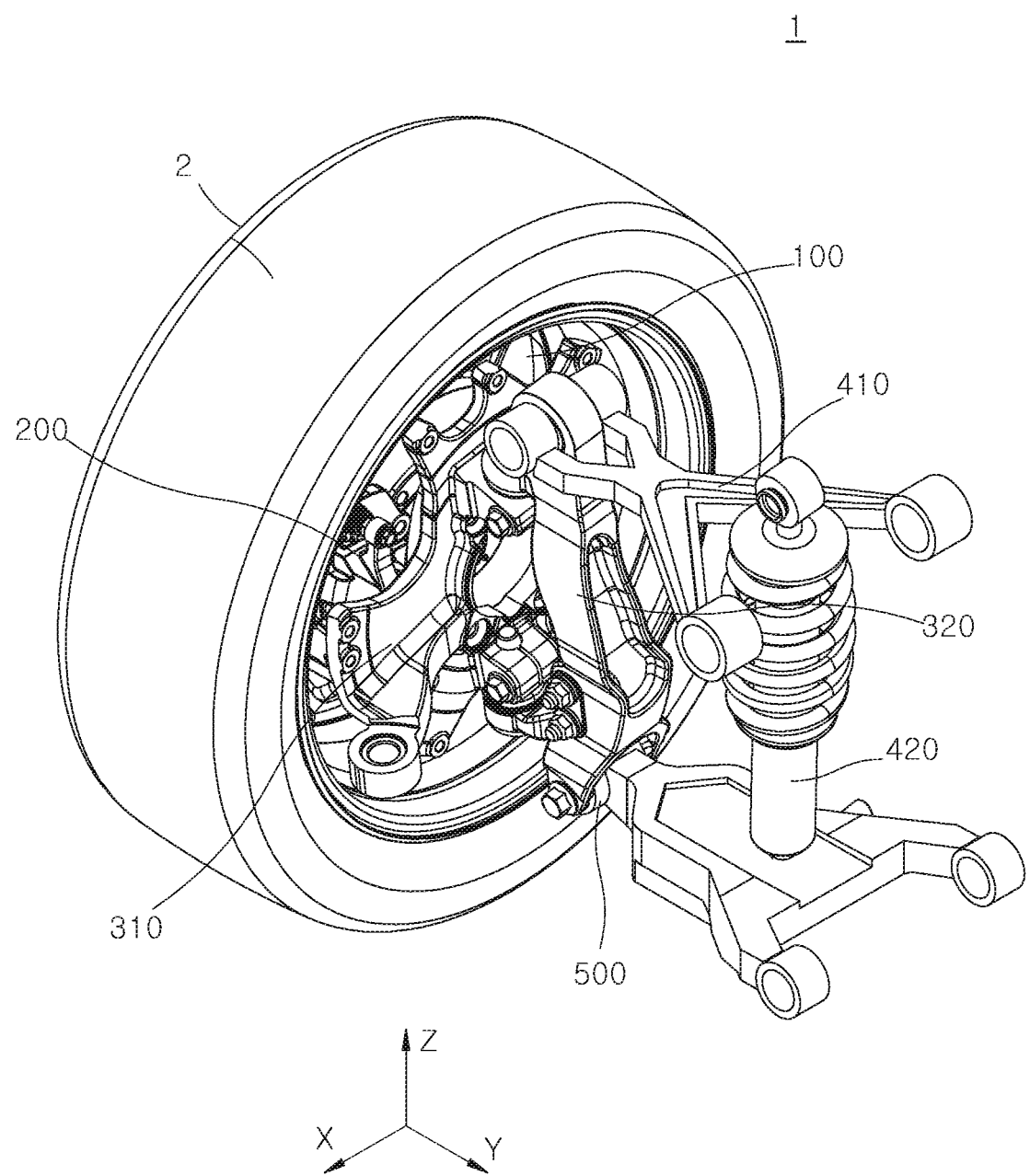
FIG. 1 is a perspective view schematically illustrating a configuration of a suspension apparatus for a vehicle according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
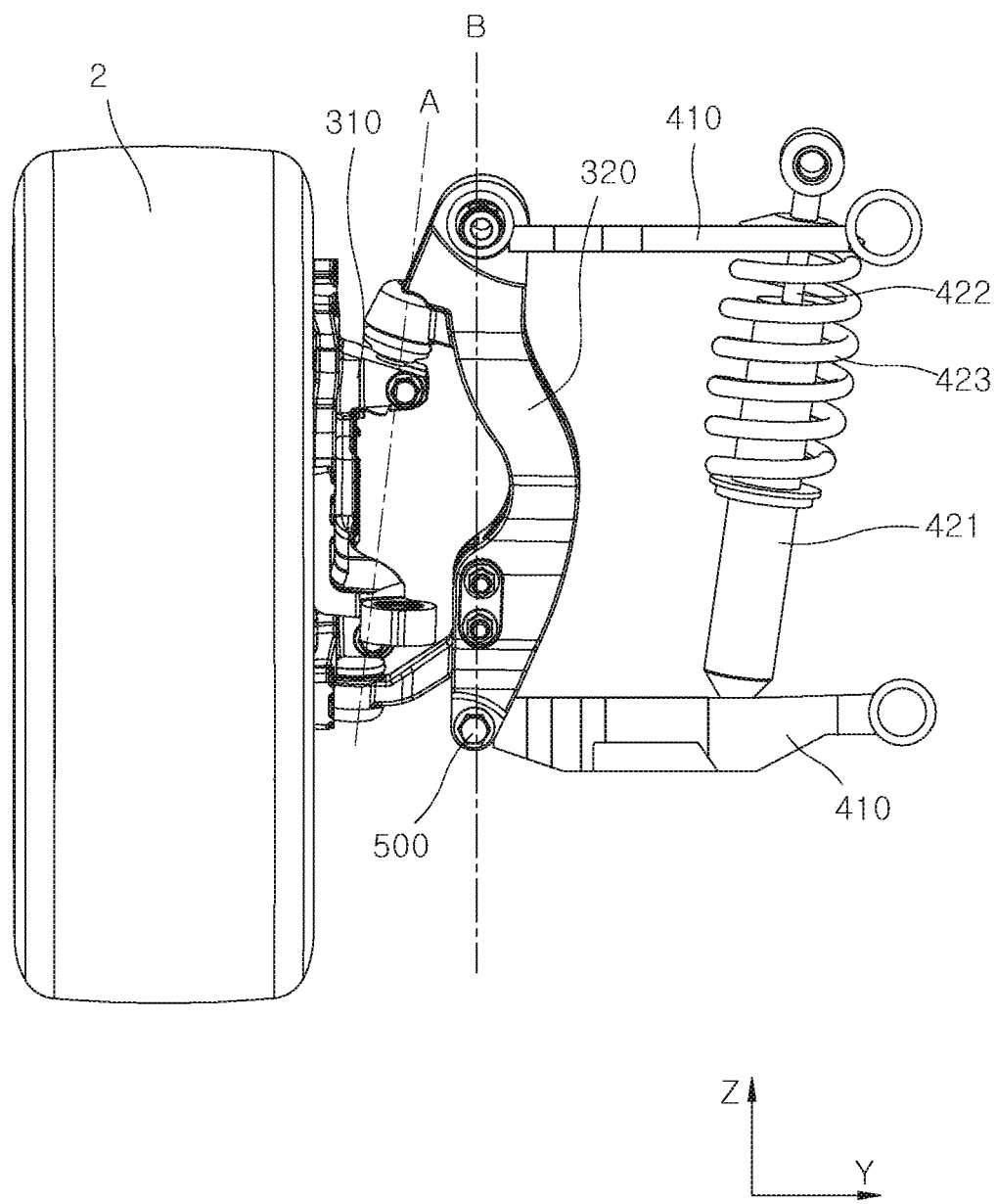
FIG. 2 is a front view schematically illustrating the configuration of the suspension apparatus for a vehicle according to the embodiment of the present disclosure.
Figure 3:
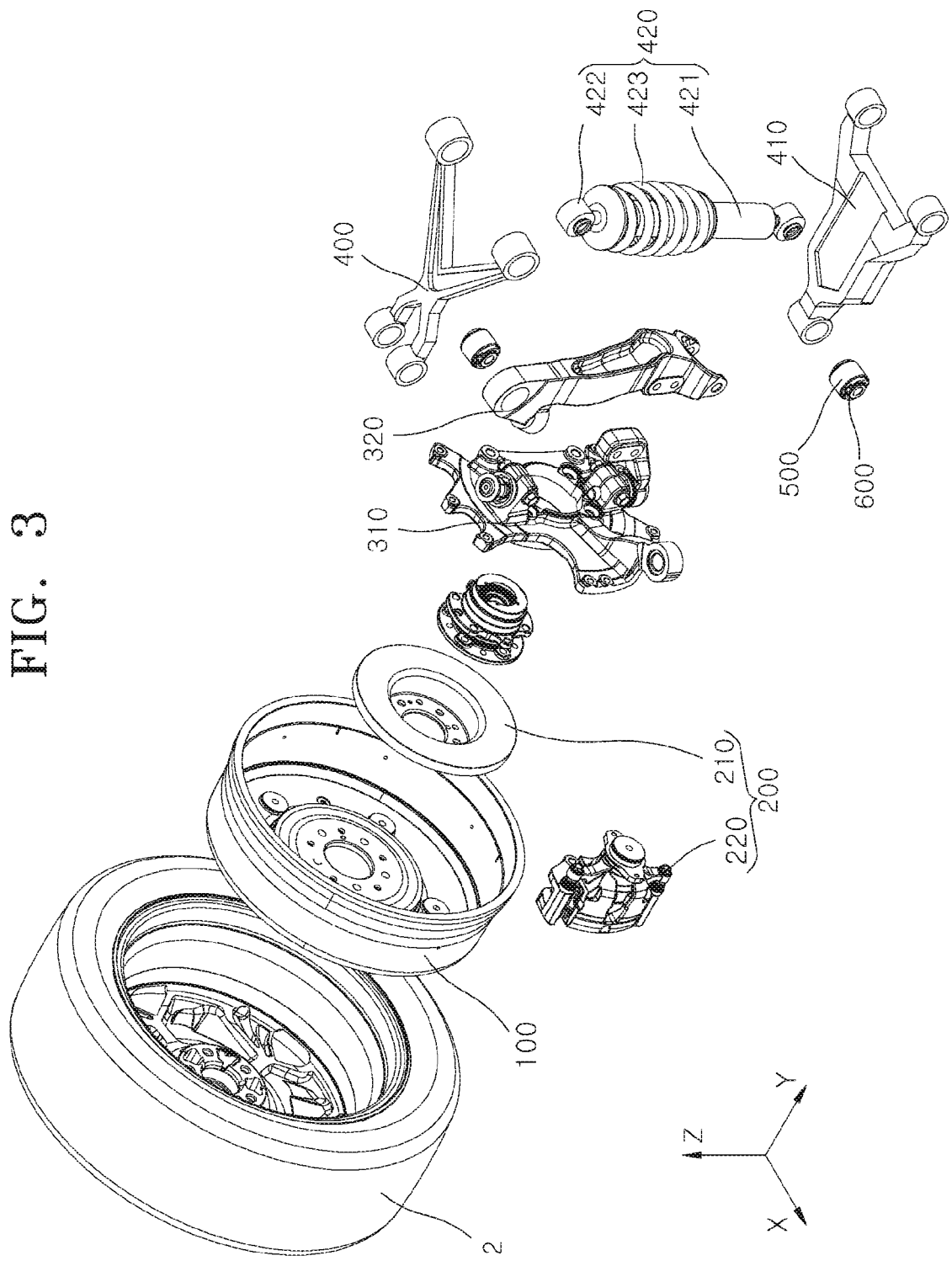
FIG. 3 is an exploded perspective view schematically illustrating the configuration of the suspension apparatus for a vehicle according to the embodiment of the present disclosure.

FIG. 1 is a perspective view schematically illustrating a configuration of a suspension apparatus for a vehicle according to an embodiment of the present disclosure, FIG. 2 is a front view schematically illustrating the configuration of the suspension apparatus for a vehicle according to the embodiment of the present disclosure, and FIG. 3 is an exploded perspective view schematically illustrating the configuration of the suspension apparatus for a vehicle according to the embodiment of the present disclosure.

Referring to FIGS. 1 to 3, a suspension apparatus 1 for a vehicle according to the embodiment of the present disclosure includes a drive unit 100, a braking unit 200, a first knuckle 310, a second knuckle 320, a suspension arm 410, a shock absorber unit 420, a bushing unit 500, and a rotation restriction unit 600.

The drive unit 100 is installed in a wheel 2 of a vehicle and rotates the wheel 2 by providing driving power to the wheel 2. The drive units 100 are respectively installed in the wheels 2 of the vehicle and independently provide driving power to the plurality of wheels 2. The drive unit 100 according to the embodiment of the present disclosure may include a stator fixed inside the wheel 2 and configured to form a magnetic field by receiving power from a battery of the vehicle, and a rotor rotatably installed inside the wheel 2 and configured to rotate the wheel 2 by means of an electromagnetic interaction with the stator. The stator and the rotor have central axes positioned on the same line as a central axis of the wheel 2. The stator and the rotor may be disposed inside the wheel 2 and stacked on each other on a concentric circle.

The braking unit 200 is installed inside the wheel 2 and applies a braking force or cut off the application of the braking force while interfering with the rotation of the wheel 2.

The braking unit 200 according to the embodiment of the present disclosure includes a brake disc 210 and a brake caliper 220.

The brake disc 210 is connected to the wheel 2 or the drive unit 100 and rotates in conjunction with the rotation of the wheel 2. The brake disc 210 according to the embodiment of the present disclosure has a circular plate shape and is installed inside the wheel 2. The brake disc 210 is disposed so that a central axis thereof is positioned on the same line as the central axis of the wheel 2. The brake disc 210 may be integrally connected to the wheel 2 or the rotor of the drive unit 100 by bolting or the like. Therefore, when the wheel 2 rotates, the brake disc 210 may rotate about the central axis together with the wheel 2. A diameter of the brake disc 210 may be variously designed and modified based on a diameter of the wheel 2, a size of the drive unit 100, or the like.

The brake caliper 220 applies the braking force by pressing the brake disc 210 at the time of braking the vehicle. The brake caliper 220 according to the embodiment of the present disclosure may include a brake pad disposed to face the brake disc 210, a caliper housing coupled to the first knuckle 310 and configured to support the brake pad so that the brake pad is movable, and a piston installed in the caliper housing and configured to be movable forward or rearward, the piston being configured to press the brake pad toward the brake disc 210 or release the brake pad depending on a movement direction.

The first knuckle 310 is coupled to the drive unit 100 and transmits a steering force to the wheel 2, and the first knuckle 310 rotates about the second knuckle 320 to be described below. More specifically, the first knuckle 310 provides mechanical connection between the drive unit 100 and the braking unit 200 and serves as a configuration for defining a kingpin axis A, which is a central axis of steering, when the wheel 2 is steered. The first knuckle 310 may rotate by receiving, from a tie rod (not illustrated) or the like, the steering force generated from a steering actuator (not illustrated) or the steering wheel (not illustrated).

The first knuckle 310 according to the embodiment of the present disclosure may be coupled to and supported on the stator of the drive unit 100 by bolting or the like. The first knuckle 310 may support the rotor of the drive unit 100 by means of a wheel bearing so that the rotor is rotatable. The first knuckle 310 may be manufactured by forming a metallic material by casting or the like in order to ensure sufficient rigidity. Two opposite upper and lower ends of the first knuckle 310 are rotatably supported on the second knuckle 320 to be described below. The two opposite ends of the first knuckle 310 is disposed to be inclined at a predetermined angle with respect to a Z-axis perpendicular to the ground surface. In this case, an inclination angle of each of the two opposite ends of the first knuckle 310 may be set to be equal to an inclination angle of the kingpin axis A that is the central axis of the steering. The specific shape of the first knuckle 310 is not limited to the shape illustrated in FIGS. 1 and 2. The shape of the first knuckle 310 may be variously designed and modified within the technical spirit in which the first knuckle 310 is coupled to the drive unit 100 and disposed to face an inner surface of the wheel 2.

The second knuckle 320 is disposed to face the first knuckle 310 and supports the first knuckle 310 so that the first knuckle 310 is rotatable. The second knuckle 320 provides mechanical connection between the wheel 2 and the suspension arm 410 to be described below and serves as a configuration for defining a suspension axis B that guides a bump and rebound motion of the wheel 2. In this case, for example, the suspension axis B may be an axis disposed in parallel with the Z-axis based on FIGS. 1 and 2.

The second knuckle 320 according to the embodiment of the present disclosure is disposed to face the first knuckle 310 in a width direction of the vehicle. Two opposite upper and lower ends of the second knuckle 320 are respectively connected to the two opposite upper and lower ends of the first knuckle 310 by means of ball joints. Therefore, the suspension axis B defined on the second knuckle 320 and the kingpin axis A defined on the first knuckle 310 are separated from each other in the width direction of the vehicle, such that the kingpin axis A may be disposed at a position closer to the wheel 2, a kingpin offset value may be decreased, and traveling and braking stability of the vehicle may be improved. The specific shape of the second knuckle 320 is not limited to the shape illustrated in FIGS. 1 and 2. The shape of the second knuckle 320 may be variously designed and modified within the technical spirit in which the second knuckle 320 may be disposed to face the first knuckle 310 and support the first knuckle 310 so that the first knuckle 310 is rotatable.

The suspension arm 410 extends from a vehicle body and absorbs impact or vibration applied to the wheel 2 from a ground surface. More specifically, the suspension arm 410 supports the second knuckle 320 on the vehicle body and uses its own rigidity to absorb a load applied from the wheel 2 while the vehicle travels. The suspension arm 410 serves to adjust a motion of the wheel 2 when the wheel 2 performs the bump and rebound motion.

The suspension arm 410 according to the embodiment of the present disclosure is installed between the second knuckle 320 and the vehicle body. The suspension arm 410 has one end rotatably connected to the vehicle body, and the other end disposed to face the second knuckle 320. The other end of the suspension arm 410 supports the second knuckle 320 by means of the bushing unit 500 to be described below or a separate connection member (not illustrated) so that the second knuckle 320 is rotatable. The suspension arm 410 is provided as a pair of suspension arms 410, and the pair of suspension arms 410 is disposed to face each other and spaced apart from each other in an upward/downward direction. The other ends of the pair of suspension arms 410 are respectively connected to the upper and lower ends of the second knuckle 320. The pair of suspension arms 410 may be formed to have a double wishbone shape. Therefore, the suspension arm 410 may set a negative camber of the wheel 2, which makes it possible to improve cornering performance of the vehicle and set a low-height structure for reducing a vehicle height.

The shock absorber unit 420 is provided to be extendable and contractible in a longitudinal direction and absorbs impact or vibration transmitted to the vehicle body through the wheel 2 from the ground surface. The shock absorber unit 420 according to the embodiment of the present disclosure includes a cylinder 421, a rod 422, and an elastic body 423.

The cylinder 421 extends in the upward/downward direction, and the interior of the cylinder 421 is charged with a fluid. The cylinder 421 penetrates the suspension arm 410, which is disposed at an upper side between the pair of suspension arms 410, and a lower end of the cylinder 421 may be rotatably connected to an upper surface of the suspension arm 410 disposed at a lower side.

The rod 422 extends in a longitudinal direction of the cylinder 421. A lower side of the rod 422 is inserted into an upper end of the cylinder 421 and installed to be slidable in the longitudinal direction of the cylinder 421. The rod 422 slides in the longitudinal direction of the cylinder 421 in conjunction with a pressure of the fluid stored in the cylinder 421.

The elastic body 423 is disposed to surround an outer surface of the cylinder 421 and an outer surface of the rod 422 and changes in length in conjunction with the sliding motion of the rod 422. The elastic body 423 according to the embodiment of the present disclosure may be provided in the form of a coil spring that is extendable and contractible in the longitudinal direction. Two opposite ends of the elastic body 423 may be respectively coupled to and supported by a lower seat fixed to the cylinder 421 and an upper seat fixed to the rod 422. The elastic body 423 accumulates an elastic restoring force while being compressed or extended when the rod 422 slides. The elastic body 423 may use the accumulated elastic restoring force to offset impact applied from the ground surface.

The bushing unit 500 is provided between the second knuckle 320 and the suspension arm 410 and supports the second knuckle 320 so that the second knuckle 320 is rotatable relative to the suspension arm 410. The bushing unit 500 may be provided as a pair of bushing units 500, and the pair of bushing units 500 is respectively installed between the pair of suspension arms 410 and the two opposite ends of the second knuckle 320. Alternatively, the bushing unit 500 may be installed only between any one suspension arm 410 and one end of the second knuckle 320.

Figure 4:
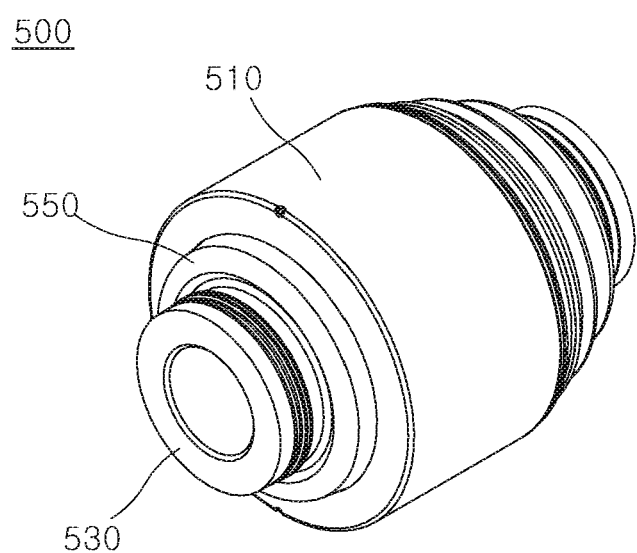
FIG. 4 is a perspective view schematically illustrating configurations of a bushing unit and a rotation restriction unit according to the embodiment of the present disclosure.
Figure 5:
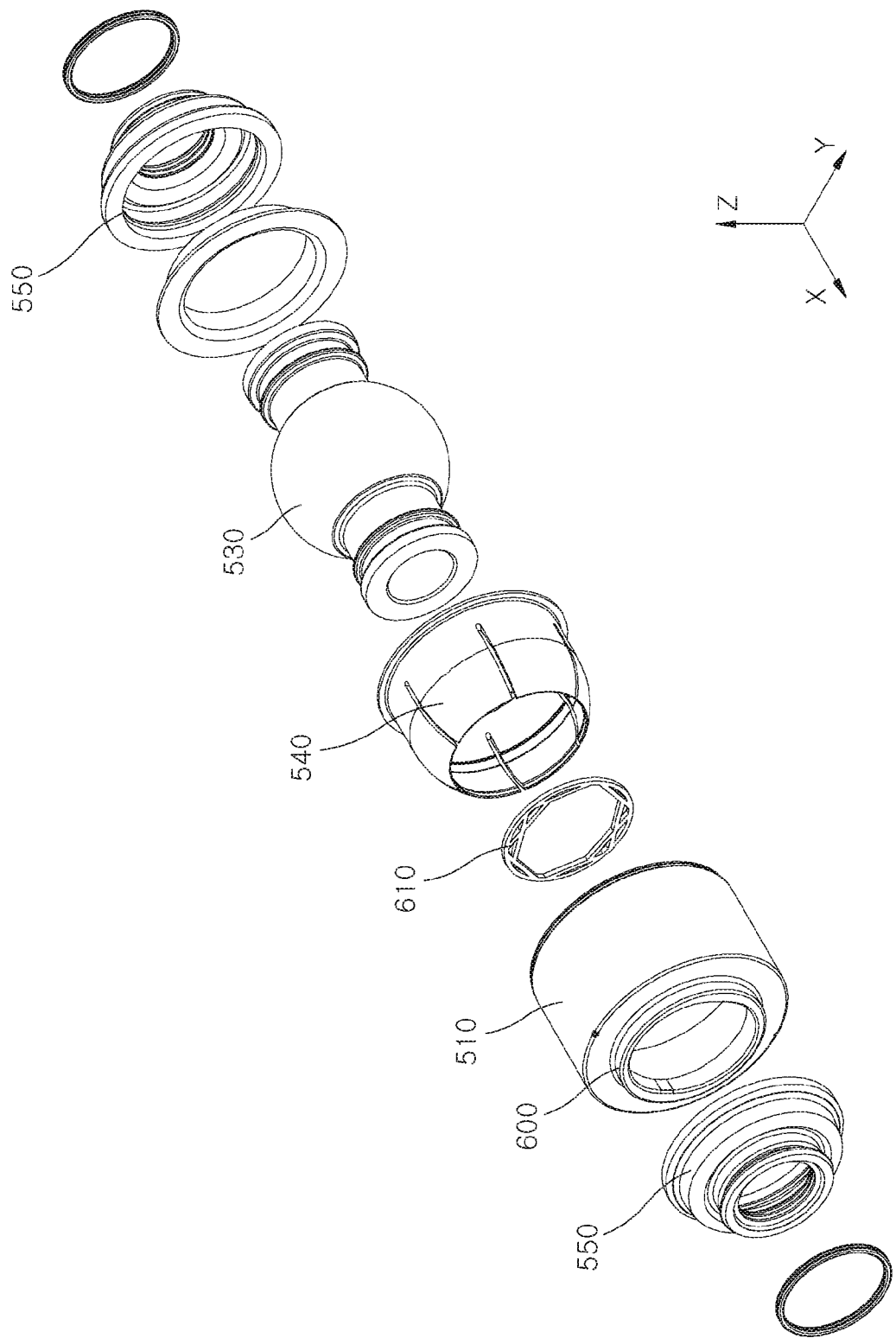
FIG. 5 is an exploded perspective view schematically illustrating the configurations of the bushing unit and the rotation restriction unit according to the embodiment of the present disclosure.
Figure 6:
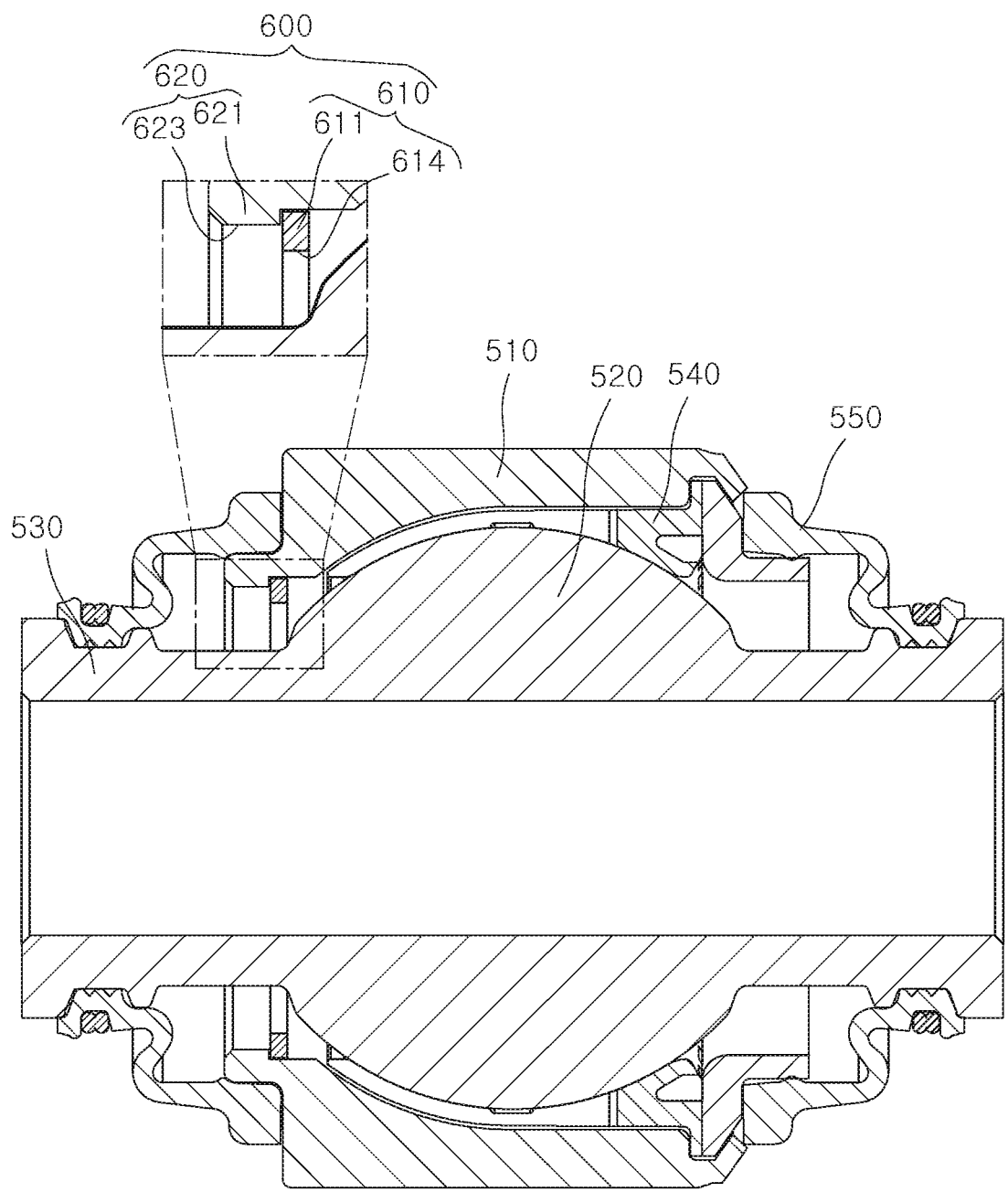
FIG. 6 is a cross-sectional view schematically illustrating the configurations of the bushing unit and the rotation restriction unit according to the embodiment of the present disclosure.
Figure 7:
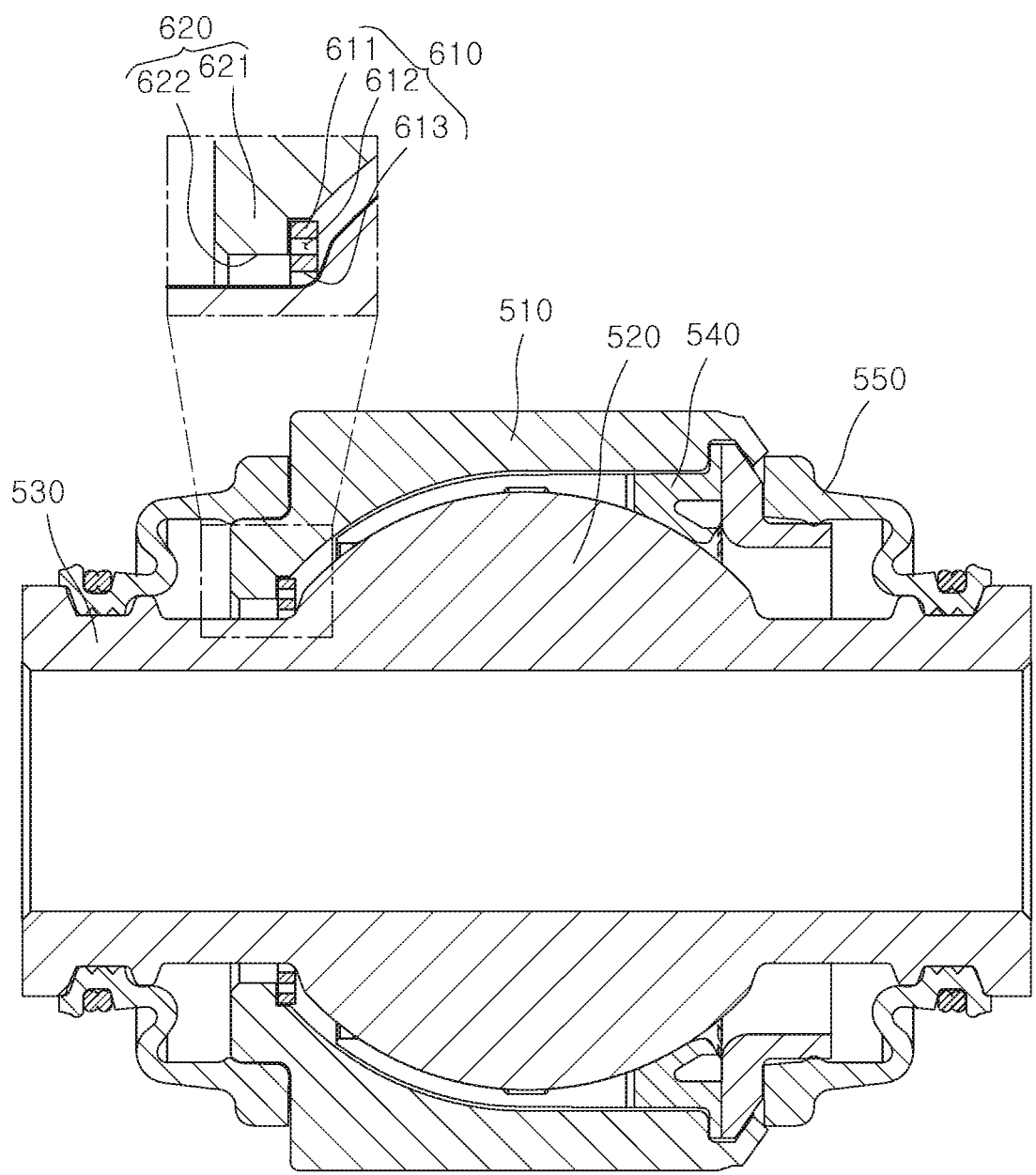
FIG. 7 is a cross-sectional view illustrating the configurations of the bushing unit and the rotation restriction unit according to the embodiment of the present disclosure when viewed at a point in time different from that in FIG. 6.

FIG. 4 is a perspective view schematically illustrating configurations of the bushing unit and the rotation restriction unit according to the embodiment of the present disclosure, FIG. 5 is an exploded perspective view schematically illustrating the configurations of the bushing unit and the rotation restriction unit according to the embodiment of the present disclosure, FIG. 6 is a cross-sectional view schematically illustrating the configurations of the bushing unit and the rotation restriction unit according to the embodiment of the present disclosure, and FIG. 7 is a cross-sectional view illustrating the configurations of the bushing unit and the rotation restriction unit according to the embodiment of the present disclosure when viewed at a point in time different from that in FIG. 6.

Referring to FIGS. 4 to 7, the bushing unit 500 according to the embodiment of the present disclosure includes a casing 510, a stud 520, an extension part 530, a bearing 540, and a shield 550.

The casing 510 defines a schematic external appearance of the bushing unit 500 according to the embodiment of the present disclosure and entirely supports the stud 520, the extension part 530, the bearing 540, and the shield 550, which will be described below. The casing 510 is coupled to the suspension arm 410. The casing 510 according to the embodiment of the present disclosure may have a cylindrical shape opened at two opposite ends thereof. The casing 510 is fixed by being inserted into the other end of the suspension arm 410. In this case, the casing 510 may be fixed as an outer peripheral surface of the casing 510 is press-fitted into or welded to an inner peripheral surface of the other end of the suspension arm 410. The casing 510 is disposed so that a direction of a central axis thereof is parallel to the X-axis based on FIGS. 1 and 4.

The stud 520 is installed in the casing 510 so as to be rotatable about multiple axes. The stud 520 according to the embodiment of the present disclosure may have an approximately spherical shape and be rotatably installed in the casing 510.

The extension part 530 extends from the stud 520 and is coupled to the second knuckle 320. The extension part 530 according to the embodiment of the present disclosure may be provided in the form of a rod extending from an outer peripheral surface of the stud 520 in a radial direction of the stud 520. The extension part 530 is provided as a pair of extension parts 530, and the pair of extension parts 530 extends to two opposite sides of the stud 520. The extension part 530 is disposed so that a longitudinal direction thereof is parallel to the longitudinal direction of the casing 510, i.e., the X-axis based on FIGS. 1 and 5. An end of the extension part 530 protrudes to the outside of the casing 510 and is fixed to an end of the second knuckle 320. The extension part 530 may rotate about a first axis, a second axis, and a third axis together with the stud 520 when the stud 520 rotates.

For example, the first axis, the second axis, and the third axis, which will be described below, are different coordinate axes defined by a center of the stud 520 as an origin. For example, the first axis, the second axis, and the third axis may be coordinate axes respectively disposed in parallel with the Z-axis, the Y-axis, and the X-axis based on FIGS. 1 and 4. In addition, the first axis is disposed to be perpendicular to the ground surface, such that the first axis is also disposed in parallel with the suspension axis B defined on the second knuckle 320.

The bearing 540 is provided between the casing 510 and the stud 520 and supports the stud 520 so that the stud 520 is rotatable relative to the casing 510. The bearing 540 according to the embodiment of the present disclosure is disposed in the casing 510 and surrounds an outer surface of the stud 520. An inner surface of the bearing 540 is in rollable contact with an outer surface of the stud 520. Therefore, the bearing 540 may allow the stud 520 to rotate about the multiple axes in place while being kept at an exact position in the casing 510.

The shield 550 prevents foreign substances from being introduced into the casing 510. The shield 550 according to the embodiment of the present disclosure is provided in the form of an approximately bellows, and two opposite ends of the shield 550 are respectively fixed to an outer peripheral surface of the casing 510 and an outer peripheral surface of the extension part 530. The shield 550 may be made of an elastically deformable material such as rubber or silicone to prevent interference with the movement of the extension part 530 according to the rotational motion of the stud 520.

The rotation restriction unit 600 is provided on the bushing unit 500 and selectively restricts the rotation direction of the second knuckle 320. More specifically, the rotation restriction unit 600 interferes with the extension part 530 that moves relative to the casing 510 when the stud 520 rotates, such that the rotation of the second knuckle 320 about the first axis parallel to the Z-axis and the suspension axis B is restricted. In addition, the rotation restriction unit 600 may enable the second knuckle 320 to rotate about the second and third axes perpendicular to the Z-axis and the suspension axis B. Therefore, the rotation restriction unit 600 may prevent the second knuckle 320 from being rotated integrally with the first knuckle 310 by the rotational force of the first knuckle 310 when the vehicle performs the steering operation, and thus the rotation restriction unit 600 may prevent an increase in kingpin offset. In addition, the rotation restriction unit 600 may prevent the second knuckle 320 from being rotated about the first axis by its own caster angle when the wheel performs the bump and rebound motion. In addition, the rotation restriction unit 600 may prevent the second knuckle 320 from being rotated about the first axis parallel to the Z-axis and the suspension axis B without installing a separate additional link on the second knuckle 320. Therefore, it is possible to reduce a weight of the vehicle and costs.

The rotation restriction unit 600 according to the embodiment of the present disclosure includes a first rotation restriction unit 610 and a second rotation restriction unit 620.

The first rotation restriction unit 610 is installed between the casing 510 and the extension part 530 and interferes with the extension part 530, thereby primarily restricting the rotation of the stud 520 about the first axis. Hereinafter, an example will be described in which the first rotation restriction unit 610 is installed only on any one of the pair of extension parts 530. However, the present disclosure is not limited thereto, and the first rotation restriction units 610 may be respectively installed on both the pair of extension parts 530.

Figure 8:
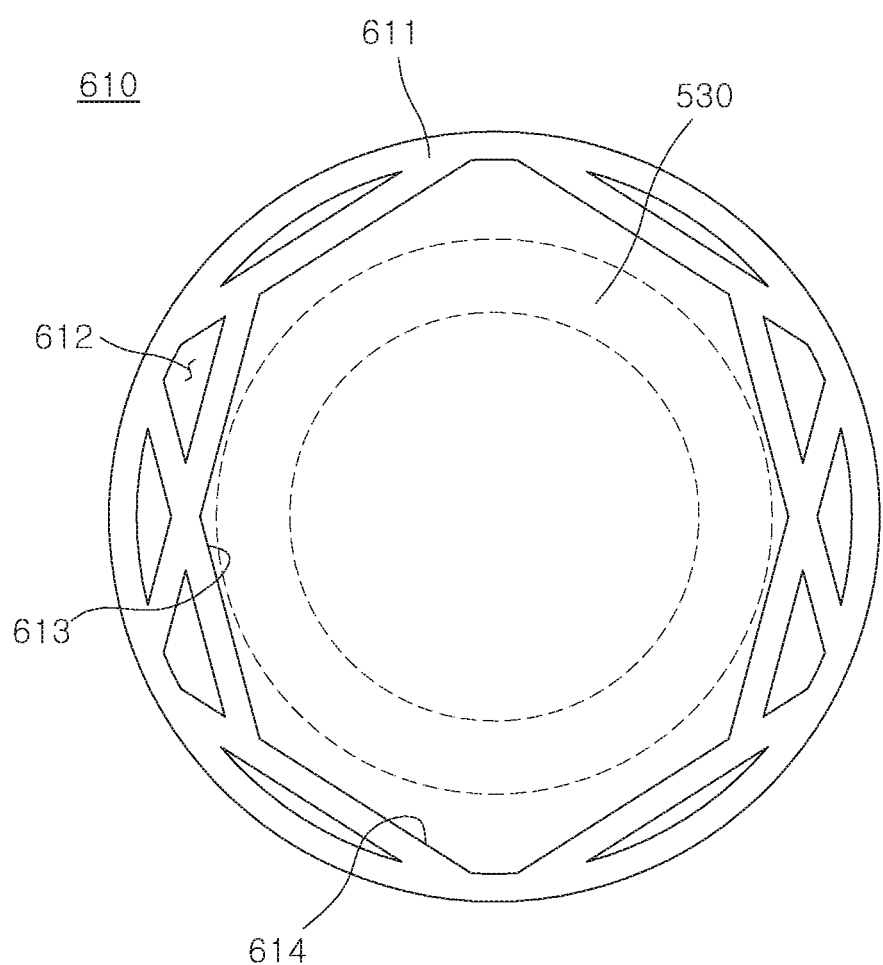
FIG. 8 is a view schematically illustrating an installed state of a first rotation restriction unit according to the embodiment of the present disclosure.
Figure 9:
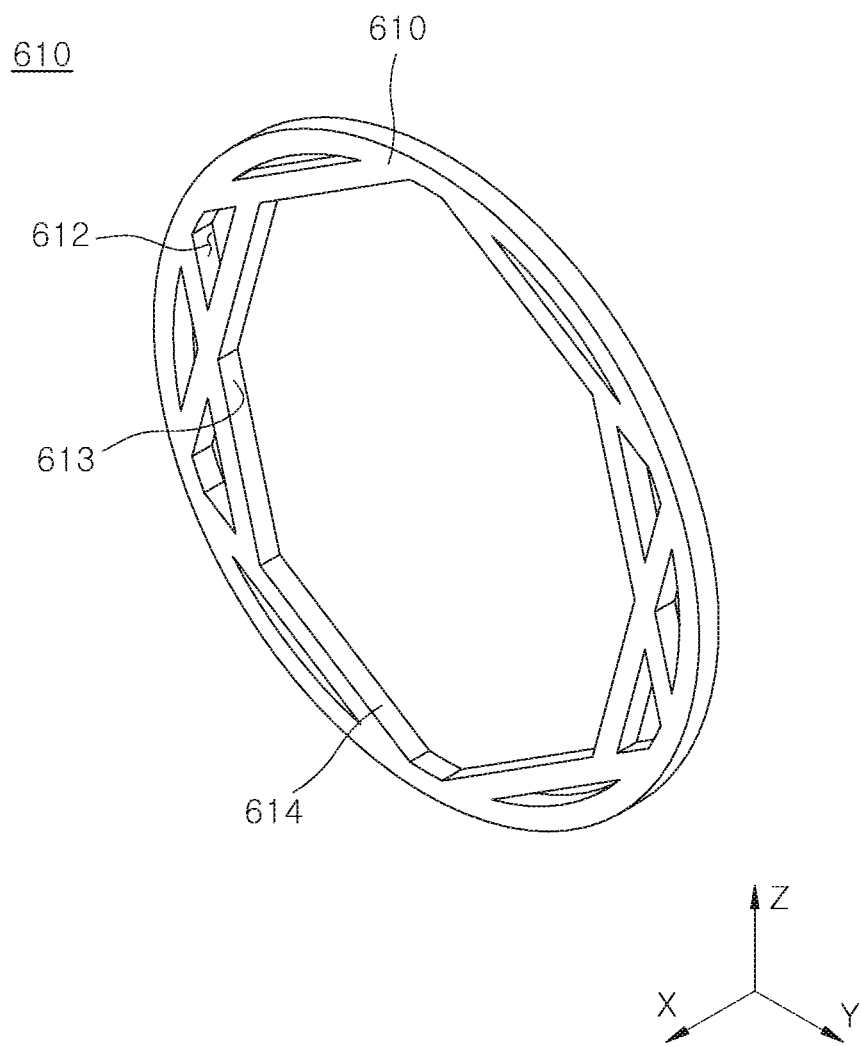
FIG. 9 is a perspective view schematically illustrating a configuration of the first rotation restriction unit according to the embodiment of the present disclosure.

FIG. 8 is a view schematically illustrating an installed state of the first rotation restriction unit according to the embodiment of the present disclosure, and FIG. 9 is a perspective view schematically illustrating a configuration of the first rotation restriction unit according to the embodiment of the present disclosure.

Referring to FIGS. 4 to 9, the first rotation restriction unit 610 according to the embodiment of the present disclosure includes a first rotation restriction body 611, a first rotation restriction member 613, and a first rotation allowance member 614.

The first rotation restriction body 611 defines a schematic external appearance of the first rotation restriction unit 610 and installed between the casing 510 and the extension part. The first rotation restriction body 611 according to the embodiment of the present disclosure has an approximately circular ring shape and is installed in the casing 510. An outer peripheral surface of the first rotation restriction body 611 may be fixed to an inner surface of the casing 510 by welding, fitting, or the like. The first rotation restriction body 611 is disposed so that the inner peripheral surface thereof surrounds an outer peripheral surface of the extension part 530. The first rotation restriction body 611 is disposed so that a central axis thereof is positioned on the same axis as the extension part 530.

The first rotation restriction body 611 may include a flexible material such as plastic so as to be elastically deformable. Therefore, the first rotation restriction body 611 may restrict a movement of the extension part 530 by interfering with the extension part 530 and changes in shape within a predetermined range to mitigate impact applied from the extension part 530. In addition, in case that the suspension motion of the second knuckle 320 is completed, the elastic restoring force accumulated by the deformation of the first rotation restriction body 611 may restore the extension part 530 to an original position.

The first rotation restriction body 611 may have a deformation guide part 612 configured to guide the deformation of the first rotation restriction body 611. The deformation guide part 612 according to the embodiment of the present disclosure may be provided in the form of a hole formed through the first rotation restriction body 611. The deformation guide part 612 may be provided as a plurality of deformation guide parts 612, and the plurality of deformation guide parts 612 may be arranged to be spaced apart from one another over the entire area of the first rotation restriction body 611. Therefore, the deformation guide part 612 may define a space in the first rotation restriction body 611 so that the space may autonomously absorb the amount of deformation of the first rotation restriction body 611, which makes it possible to prevent the first rotation restriction body 611 from excessively interfering with the adjacent casing 510 or the like during a process in which the first rotation restriction body 611 is deformed or prevent a deformation load from excessively increasing. The specific shape of the deformation guide part 612 is not limited to the shape illustrated in FIG. 8, and the deformation guide part 612 may be designed and modified in various shapes.

The first rotation restriction member 613 is provided at one side of an inner peripheral surface of the first rotation restriction body 611 and comes into contact with the extension part 530 when the stud 520 rotates about the first axis, i.e., an axis in the direction parallel to the Z-axis direction, thereby restricting the rotation of the stud 520. For example, the first rotation restriction member 613 according to the embodiment of the present disclosure may be a partial section of an entire peripheral surface of the inner peripheral surface of the first rotation restriction body 611 that faces the outer peripheral surface of the extension part 530. Based on FIG. 8, the first rotation restriction member 613 is disposed to face and be spaced apart at a predetermined interval from the outer peripheral surface of the extension part 530 along the second axis, i.e., in the direction parallel to the Y-axis direction. The first rotation restriction member 613 is provided as a pair of first rotation restriction members 613, and the pair of first rotation restriction members 613 is disposed to face two opposite surfaces of the extension part 530 based on the direction of the second axis.

The first rotation allowance member 614 is provided at the other side of the inner peripheral surface of the first rotation restriction body 611 and allows the stud 520 to rotate about the second axis, i.e., an axis in the direction parallel to the Y-axis direction. For example, the first rotation allowance member 614 according to the embodiment of the present disclosure may be the remaining section of the entire peripheral surface of the inner peripheral surface of the first rotation restriction body 611, except for the first rotation restriction member 613. Based on FIG. 8, the first rotation allowance member 614 is disposed to face and be spaced apart at a predetermined interval from the outer peripheral surface of the extension part 530 along the first axis, i.e., in the direction parallel to the Z-axis direction. The first rotation allowance member 614 is provided as a pair of first rotation allowance members 614, and the pair of first rotation allowance members 614 is disposed to face two opposite surfaces of the extension part 530 based on the direction of the first axis.

An interval between the first rotation restriction member 613 and the extension part 530 is smaller than an interval between the first rotation allowance member 614 and the extension part 530. That is, the first rotation restriction member 613 and the first rotation allowance member 614 are formed to have a cross-sectional shape in which a width of the inner peripheral surface of the first rotation restriction body 611 along the second axis is smaller than a width of the inner peripheral surface of the first rotation restriction body 611 along the first axis. Therefore, the first rotation restriction member 613 and the first rotation allowance member 614 may decrease a range in which the stud 520 may rotate about the first axis and increase a range in which the stud 520 may rotate about the second axis. In addition, in case that the stud 520 rotates about the third axis, the extension part 530 rotates in place, such that the stud 520 may smoothly rotate about the third axis without any interference.

The second rotation restriction unit 620 extends from the casing 510 and interferes with the extension part 530, thereby finally restricting the rotation of the stud 520 about the first axis. That is, after the extension part 530 completely deforms the first rotation restriction unit 610 by a large suspension motion of the second knuckle 320, the second rotation restriction unit 620 interferes with the extension part 530, thereby finally restricting the rotation of the stud 520 about the first axis. Therefore, the second rotation restriction unit 620, together with the first rotation restriction unit 610, may restrict, in multiple ways, the rotation of the stud 520 about the first axis, such that the second knuckle 320 may more stably perform the suspension motion.

Hereinafter, an example will be described in which the second rotation restriction unit 620 is installed only on any one of the pair of extension parts 530. However, the present disclosure is not limited thereto, and the second rotation restriction units 620 may be installed on both the pair of extension parts 530.

Figure 10:
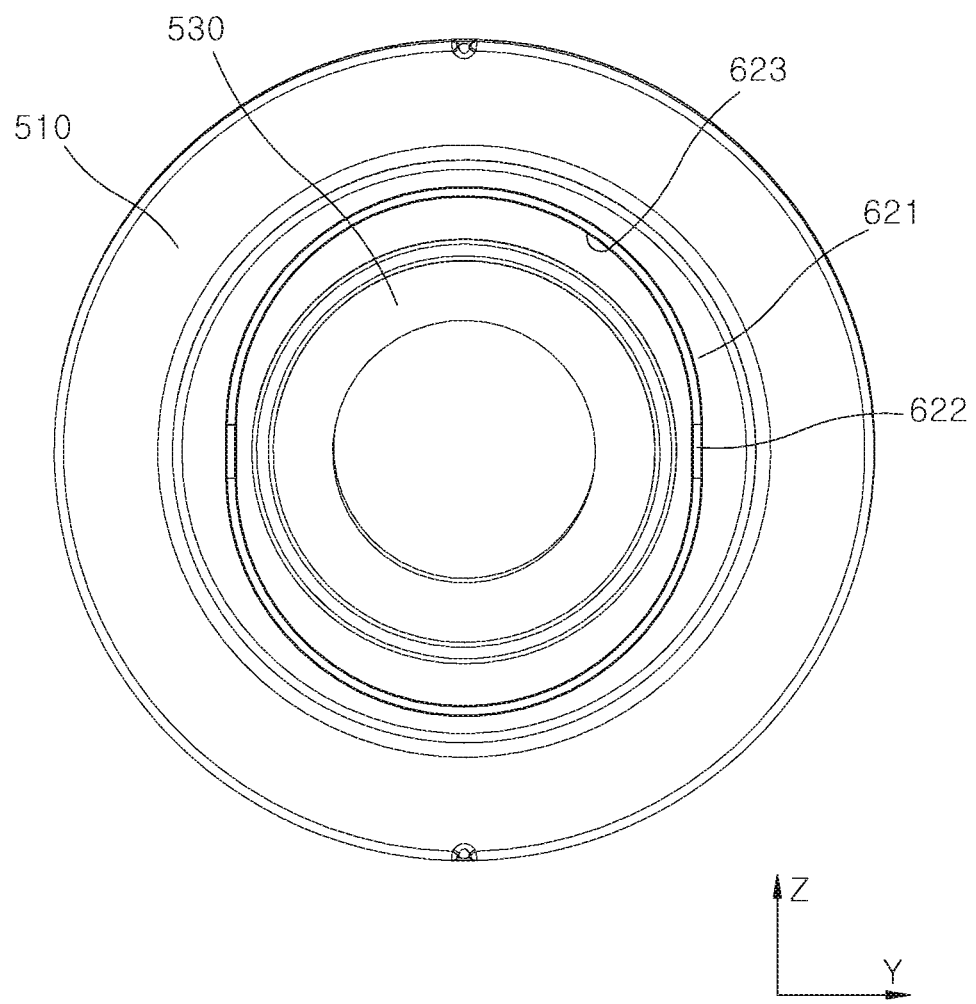
FIG. 10 is a view schematically illustrating an installed state of a second rotation restriction unit according to the embodiment of the present disclosure.
Figure 11:
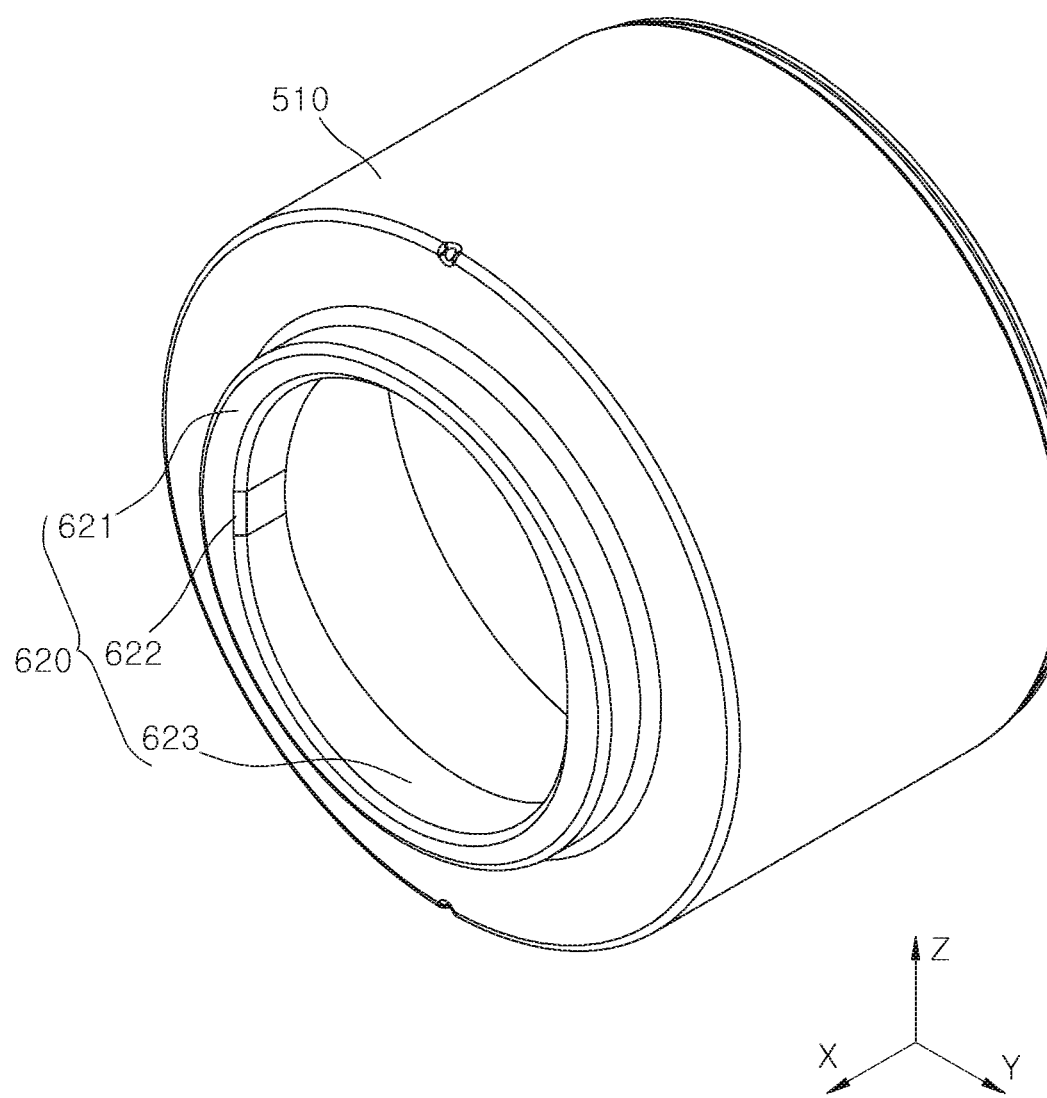
FIG. 11 is a perspective view schematically illustrating a configuration of the second rotation restriction unit according to the embodiment of the present disclosure.

FIG. 10 is a view schematically illustrating an installed state of the second rotation restriction unit according to the embodiment of the present disclosure, and FIG. 11 is a perspective view schematically illustrating a configuration of the second rotation restriction unit according to the embodiment of the present disclosure.

Referring to FIGS. 10 to 11, the second rotation restriction unit 620 according to the embodiment of the present disclosure includes a second rotation restriction body 621, a second rotation restriction member 622, and a second rotation allowance member 623.

The second rotation restriction body 621 extends from the casing 510 and defines a schematic external appearance of the second rotation restriction unit 620. The second rotation restriction body 621 according to the embodiment of the present disclosure extends from an end of the casing 510 in a longitudinal direction of the extension part 530, i.e., the direction of the third axis parallel to the X-axis. The second rotation restriction body 621 has an empty interior and communicates with an interior of the casing 510. The second rotation restriction body 621 is disposed so that the inner peripheral surface thereof surrounds an outer peripheral surface of the extension part 530.

The second rotation restriction member 622 is provided at one side of an inner peripheral surface of the second rotation restriction body 621 and comes into contact with the extension part 530 when the stud 520 rotates about the first axis, i.e., an axis in the direction parallel to the Z-axis direction, thereby restricting the rotation of the stud 520. For example, the second rotation restriction member 622 according to the embodiment of the present disclosure may be a partial section of an entire peripheral surface of the inner peripheral surface of the second rotation restriction body 621 that faces the outer peripheral surface of the extension part 530. Based on FIG. 10, the second rotation restriction member 622 is disposed to face and be spaced apart at a predetermined interval from the outer peripheral surface of the extension part 530 along the second axis, i.e., in the direction parallel to the Y-axis direction. The second rotation restriction member 622 is provided as a pair of second rotation restriction members 622, and the pair of second rotation restriction members 622 is disposed to face two opposite surfaces of the extension part 530 based on the direction of the second axis.

The second rotation allowance member 623 is provided at the other side of the inner peripheral surface of the second rotation restriction body 621 and allows the stud 520 to rotate about the second axis, i.e., in the direction parallel to the Y-axis direction. For example, the second rotation allowance member 623 according to the embodiment of the present disclosure may be the remaining section of the entire peripheral surface of the inner peripheral surface of the second rotation restriction body 621, except for the second rotation restriction member 622. Based on FIG. 10, the second rotation allowance member 623 is disposed to face and be spaced apart at a predetermined interval from the outer peripheral surface of the extension part 530 along the first axis, i.e., in the direction parallel to the Z-axis direction. The second rotation allowance member 623 is provided as a pair of second rotation allowance members 623, and the pair of second rotation allowance members 623 is disposed to face two opposite surfaces of the extension part 530 based on the direction of the first axis.

An interval between the second rotation restriction member 622 and the extension part 530 is smaller than an interval between the second rotation allowance member 623 and the extension part 530. That is, the second rotation restriction member 622 and the second rotation allowance member 623 are formed to have an elliptical shape in which a width of the inner peripheral surface of the second rotation restriction body 621 along the second axis is smaller than a width of the inner peripheral surface of the second rotation restriction body 621 along the first axis. Therefore, the second rotation restriction member 622 and the second rotation allowance member 623 may decrease a range in which the stud 520 may rotate about the first axis and increase a range in which the stud 520 may rotate about the second axis. In addition, in case that the stud 520 rotates about the third axis, the extension part 530 rotates in place, such that the stud 520 may smoothly rotate about the third axis without any interference.

In addition, the interval between the second rotation restriction member 622 and the extension part 530 is larger than the interval between the first rotation restriction member 613 and the extension part 530. Therefore, in case that the stud 520 rotates about the first axis, the second rotation restriction member 622 may allow the extension part 530 to preferentially come into contact with the first rotation restriction member 613.

Hereinafter, an operation of the suspension apparatus 1 for a vehicle according to the embodiment of the present disclosure will be described in detail.

Figure 12:
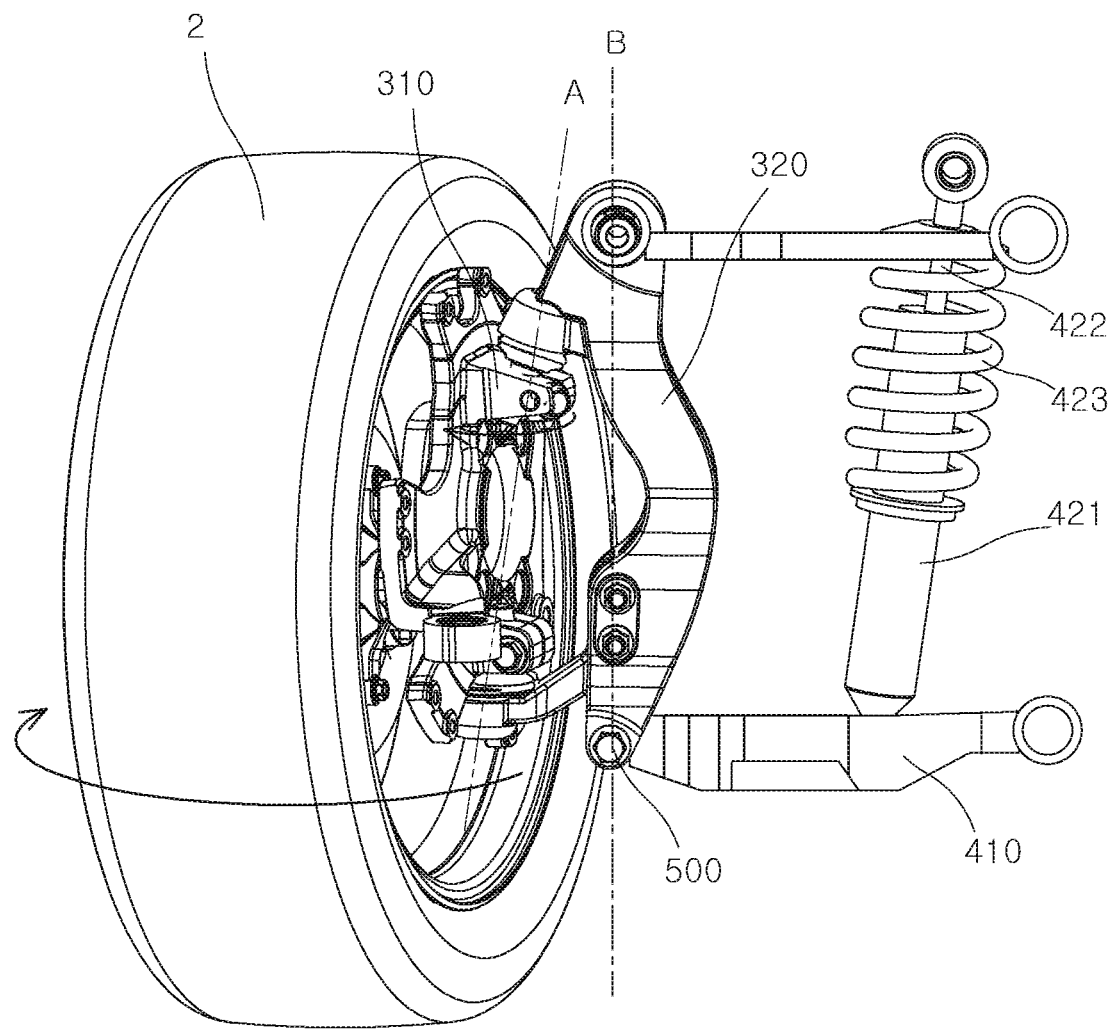
FIG. 12 is an operational view schematically illustrating that the suspension apparatus for a vehicle according to the embodiment of the present disclosure operates to adjust a steering angle of a wheel.
Figure 13:
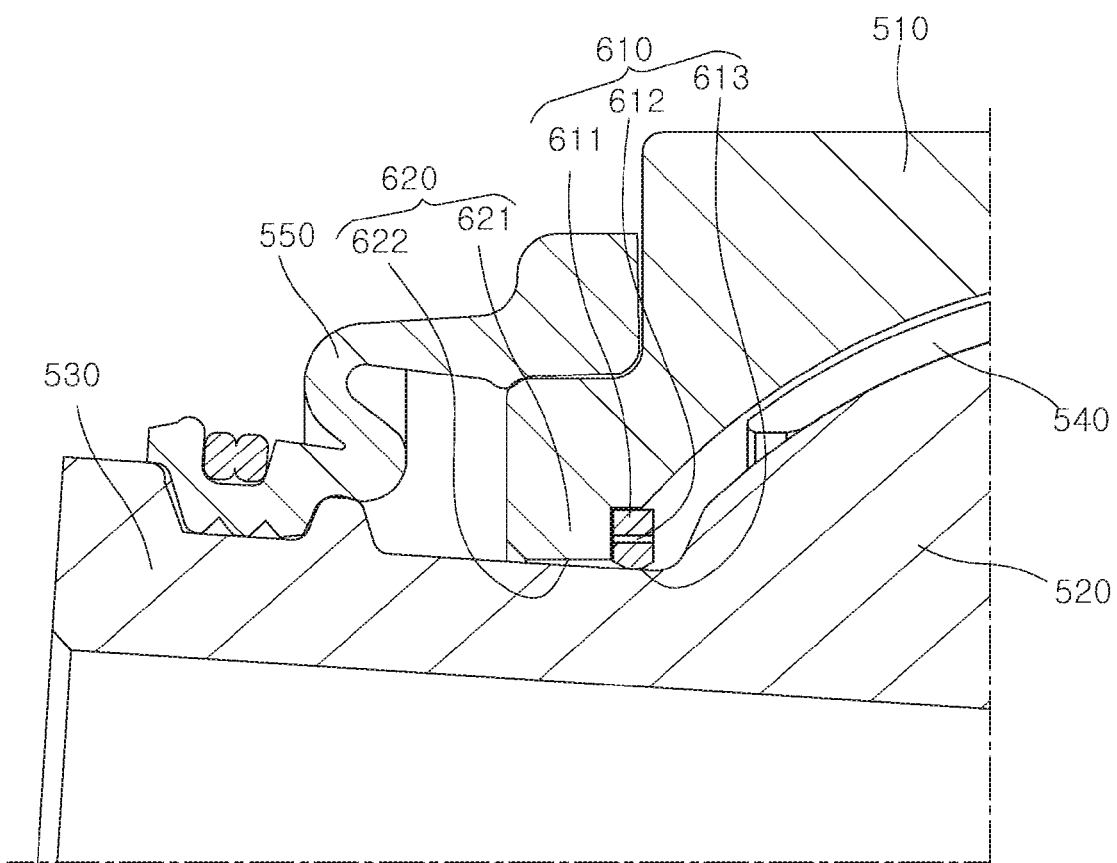
FIG. 13 is an operational view schematically illustrating a state in which the rotation restriction unit operates in accordance with the adjustment of the steering angle of the wheel.

FIG. 12 is an operational view schematically illustrating that the suspension apparatus for a vehicle according to the embodiment of the present disclosure operates to adjust a steering angle of a wheel, and FIG. 13 is an operational view schematically illustrating a state in which the rotation restriction unit operates in accordance with the adjustment of the steering angle of the wheel.

Referring to FIGS. 12 and 13, at the time of steering the vehicle, the first knuckle 310 changes the steering angle of the wheel 2 while being rotated about the kingpin axis A by the steering force generated by the steering actuator or the steering wheel.

As the first knuckle 310 rotates about the kingpin axis A, the rotational force is generated on the second knuckle 320 about the first axis parallel to the suspension axis B or the Z-axis.

The rotational force generated on the second knuckle 320 is sequentially transmitted to the extension part 530 and the stud 520, and the stud 520 rotates about the first axis.

The extension part 530 comes into contact with the first rotation restriction member 613 immediately after the extension part 530, together with the stud 520, rotates about the first axis The rotational force, which rotates the extension part 530 about the first axis, is primarily offset by a reaction force generated between the first rotation restriction member 613 and the extension part 530, and the stud 520 and the extension part 530 do not rotate about the first axis.

In this case, the first rotation restriction member 613 absorbs impact caused by the contact with the extension part 530 while being elastically deformed.

Meanwhile, in case that the rotational force, which rotates the extension part 530 about the first axis, exceeds a predetermined magnitude, the extension part 530 fully deforms the first rotation restriction member 613 and comes into contact with the second rotation restriction member 622.

The rotational force, which rotates the extension part 530 about the first axis, is finally offset by a reaction force generated between the second rotation restriction member 622 and the extension part 530, and the stud 520 and the extension part 530 do not rotate about the first axis.

Therefore, the state in which the second knuckle 320 is not rotated about the suspension axis B is maintained when the first knuckle 310 rotates.

Figure 14:
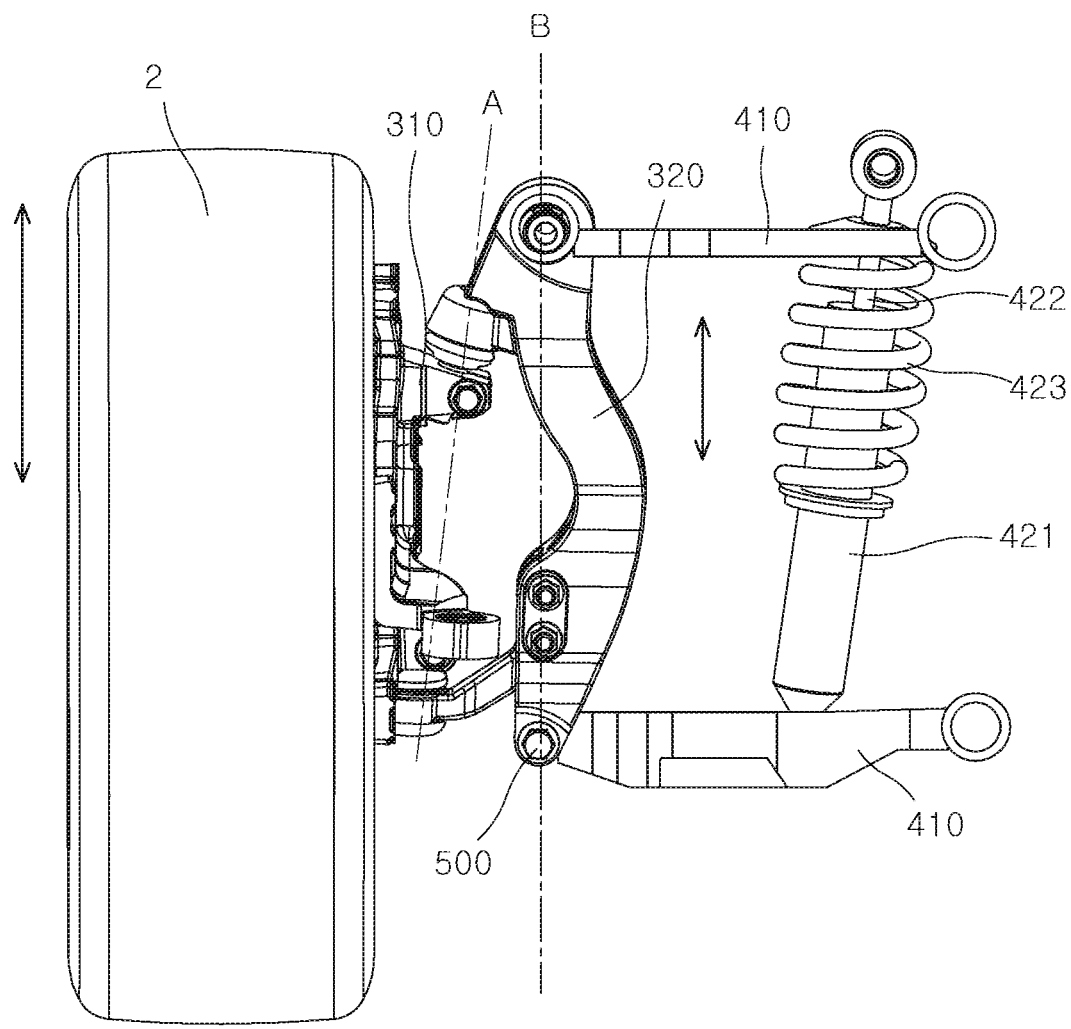
FIG. 14 is an operational view schematically illustrating a state in which the suspension apparatus for a vehicle according to the embodiment of the present disclosure operates in accordance with a bump and rebound motion of the wheel.
Figure 15:
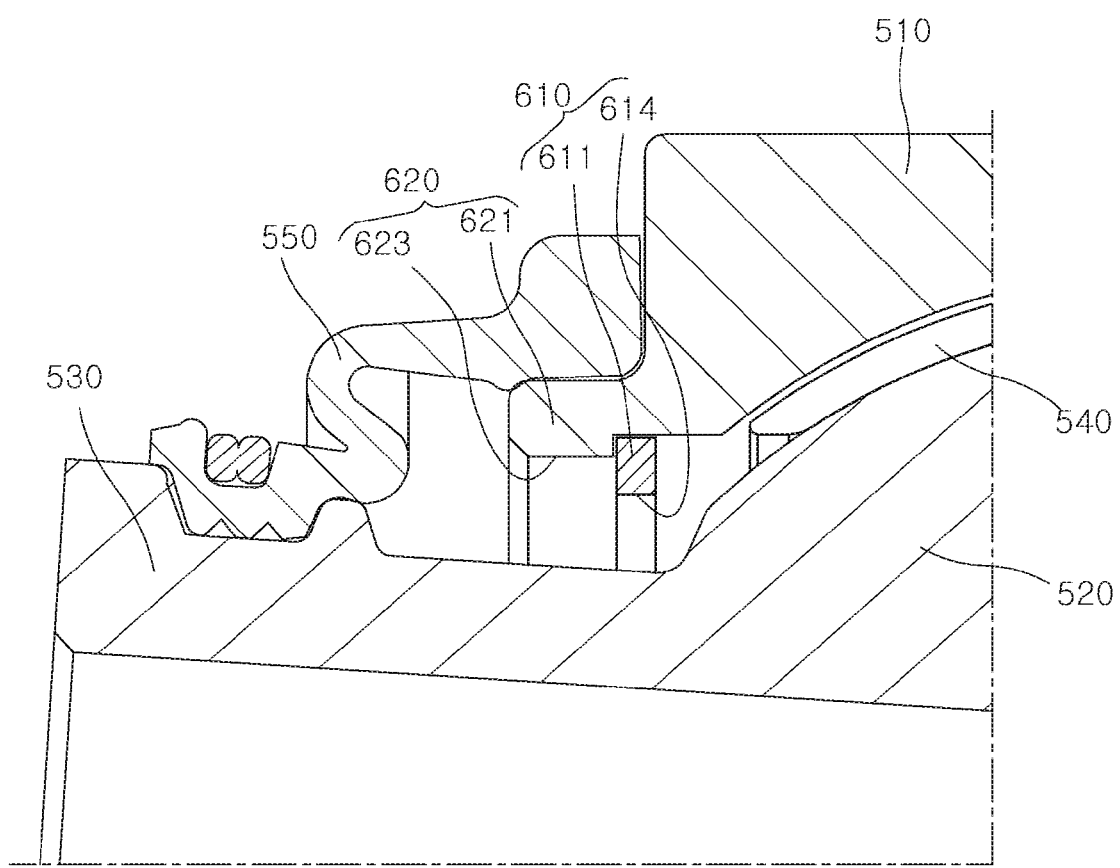
FIG. 15 is an operational view schematically illustrating a state in which the rotation restriction unit operates in accordance with the bump and rebound motion of the wheel.

FIG. 14 is an operational view schematically illustrating a state in which the suspension apparatus for a vehicle according to the embodiment of the present disclosure operates in accordance with the bump and rebound motion of the wheel, and FIG. 15 is an operational view schematically illustrating a state in which the rotation restriction unit operates in accordance with the bump and rebound motion of the wheel.

Referring to FIGS. 14 and 15, when the wheel 2 performs a bump and rebound motion because of unevenness of the ground surface, the first knuckle 310 and the second knuckle 320 integrally connected to the wheel 2 by means of the drive unit 100 move upward or downward along the suspension axis B together with the wheel 2.

In this case, in case that the rotational force, which rotates the second knuckle 320 about the first axis, is generated by the caster angle of the second knuckle 320, the first rotation restriction member 613 and the second rotation restriction member 622 restrict the rotation of the second knuckle 320 about the first axis by the above-mentioned operation.

Meanwhile, in case that the same load is applied to the pair of extension parts 530 when the second knuckle 320 moves upward or downward, the extension part 530 rotates about the third axis parallel to the X-axis without rotating about the second axis parallel to the Y-axis.

Therefore, a relative angle defined between the second knuckle 320 and the suspension arm 410 is changed, and the suspension arm 410 guides the motion of the wheel 2 in the direction parallel to the suspension axis B.

In addition, in case that different loads are applied to the pair of extension parts 530 when the second knuckle 320 moves upward or downward, the extension part 530 rotates about the third axis parallel to the X-axis and also rotates about the second axis parallel to the Y-axis.

In this case, because the intervals between the extension part 530 and the first rotation restriction member 613 and the second rotation restriction member 622 are smaller than the intervals between the extension part 530 and the first rotation allowance member 614 and the second rotation allowance member 623, the extension part 530 may rotate about the second axis without any interference to the point at which the extension part 530 comes into contact with the first rotation allowance member 614 and the second rotation allowance member 623.

Therefore, a relative angle defined between the second knuckle 320 and the suspension arm 410 is changed, the suspension arm 410 guides the motion of the wheel 2 in the direction parallel to the suspension axis B, and the bushing unit 500 guides the motion of the wheel 2 along the second axis parallel to the Y-axis.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A suspension apparatus for a vehicle, comprising:
  a drive unit configured to provide driving power to a wheel;

a first knuckle coupled to the drive unit and configured to transmit a steering force to the wheel;

a second knuckle disposed to face the first knuckle and configured to support the first knuckle so that the first knuckle is rotatable;

a suspension arm extending from a vehicle body and configured to absorb impact applied to the wheel;

a bushing unit provided between the second knuckle and the suspension arm and configured to support the second knuckle so that the second knuckle is rotatable relative to the suspension arm; and a rotation restriction unit provided on the bushing unit and configured to selectively restrict a rotation direction of the second knuckle.

2. The suspension apparatus of claim 1, wherein the bushing unit comprises:

a casing coupled to the suspension arm;

a stud installed in the casing and configured to be rotatable about multiple axes; and an extension part extending from the stud and coupled to the second knuckle.

3. The suspension apparatus of claim 2, wherein the rotation restriction unit comprises a first rotation restriction unit installed between the casing and the extension part and configured to interfere with the extension part to restrict a rotation of the stud about a first axis.

4. The suspension apparatus of claim 3, wherein the first axis is disposed to be perpendicular to a ground surface.

5. The suspension apparatus of claim 3, wherein the first rotation restriction unit comprises:

a first rotation restriction body installed between the casing and the extension part;

a first rotation restriction member provided at one side of an inner peripheral surface of the first rotation restriction body and configured to come into contact with the extension part as the stud rotates about the first axis; and a first rotation allowance member provided at the other side of the inner peripheral surface of the first rotation restriction body and configured to allow the stud to rotate about a second axis perpendicular to the first axis.

6. The suspension apparatus of claim 5, wherein the first rotation restriction body is provided to be elastically deformable.

7. The suspension apparatus of claim 6, wherein the first rotation restriction body has a deformation guide part formed through the first rotation restriction body and configured to guide deformation of the first rotation restriction body.

8. The suspension apparatus of claim 5, wherein an interval between the first rotation restriction member and the extension part is smaller than an interval between the first rotation allowance member and the extension part.

9. The suspension apparatus of claim 5, wherein the rotation restriction unit further comprises a second rotation restriction unit extending from the casing and configured to interfere with the extension part to restrict a rotation of the stud about the first axis.

10. The suspension apparatus of claim 9, wherein the second rotation restriction unit comprises:

a second rotation restriction body extending from the casing in a longitudinal direction of the extension part;

a second rotation restriction member provided at one side of an inner peripheral surface of the second rotation restriction body and configured to come into contact with the extension part as the stud rotates about the first axis; and a second rotation allowance member provided at the other side of the inner peripheral surface of the second rotation restriction body and configured to allow the stud to rotate about the second axis perpendicular to the first axis.

11. The suspension apparatus of claim 10, wherein an interval between the second rotation restriction member and the extension part is smaller than an interval between the second rotation allowance member and the extension part.

12. The suspension apparatus of claim 10, wherein an interval between the second rotation restriction member and the extension part is larger than an interval between the first rotation restriction member and the extension part.

13. The suspension apparatus of claim 2, wherein the bushing unit further comprises a bearing provided between the casing and the stud and configured to support the stud so that the stud is rotatable relative to the casing.

14. The suspension apparatus of claim 2, wherein the bushing unit further comprises a shield configured to prevent foreign substances from being introduced into the casing.

15. The suspension apparatus of claim 14, wherein the shield is provided in the form of a bellows, and two opposite ends of the shield are respectively fixed to an outer peripheral surface of the casing and an outer peripheral surface of the extension part.

* * * * *